United States Patent
Joshi et al.

(10) Patent No.: US 10,375,168 B2
(45) Date of Patent: Aug. 6, 2019

(54) THROUGHPUT IN OPENFABRICS ENVIRONMENTS

(71) Applicant: Veritas Technologies LLC, Mountain View, CA (US)

(72) Inventors: Adhiraj Joshi, Pune (IN); Abhijit Toley, Pune (IN)

(73) Assignee: Veritas Technologies LLC, Santa Clara, CA (US)

(*) Notice: Subject to any disclaimer, the term of this patent is extended or adjusted under 35 U.S.C. 154(b) by 54 days.

(21) Appl. No.: 15/168,449

(22) Filed: May 31, 2016

(65) Prior Publication Data

US 2017/0346899 A1    Nov. 30, 2017

(51) Int. Cl.
   H04L 29/08    (2006.01)
   G06F 3/06    (2006.01)
   G06F 13/28    (2006.01)

(52) U.S. Cl.
   CPC .......... *H04L 67/1097* (2013.01); *G06F 3/061* (2013.01); *G06F 3/067* (2013.01); *G06F 3/0659* (2013.01); *G06F 13/28* (2013.01); *H04L 67/2842* (2013.01); *G06F 2213/2806* (2013.01)

(58) Field of Classification Search
   CPC ..... G06F 3/06–3/0689; G06F 13/00–13/4295; G06F 2213/00–2213/4004; H04L 67/2842; H04L 67/10–67/1097; H04L 67/00–67/42
   See application file for complete search history.

(56) References Cited

U.S. PATENT DOCUMENTS

| | | | |
|---|---|---|---|
| 5,491,802 A * | 2/1996 | Thompson | H04L 49/552 709/236 |
| 6,694,392 B1 | 2/2004 | Haren | |
| 8,874,844 B1 * | 10/2014 | Glasco | G06Q 10/06311 711/118 |
| 2005/0015549 A1 | 1/2005 | Dierks et al. | |
| 2006/0095611 A1 | 5/2006 | Winchester et al. | |
| 2011/0185032 A1 | 7/2011 | Hiramoto et al. | |
| 2016/0026604 A1 * | 1/2016 | Pandit | G06F 15/17 709/212 |

FOREIGN PATENT DOCUMENTS

WO    9934273 A2    7/1999

* cited by examiner

*Primary Examiner* — Clayton R Williams
(74) *Attorney, Agent, or Firm* — Campbell Stephenson LLP

(57) ABSTRACT

Disclosed herein are systems, methods, and processes to improve throughput in OpenFabrics and Remote Direct Memory Access (RDMA) computing environments. Data and a header is received. Buffers in which the data and the header are to be written are identified. Placement information for the data and the header is determined based on a size of each buffer, a page-boundary-alignment of the data, and a header alignment of the header. The data and the header are written to the buffer(s) using the placement information. In such computing environments, throughout can be improved by writing data on page boundaries and the header on a header boundary in a second to last buffer.

17 Claims, 15 Drawing Sheets

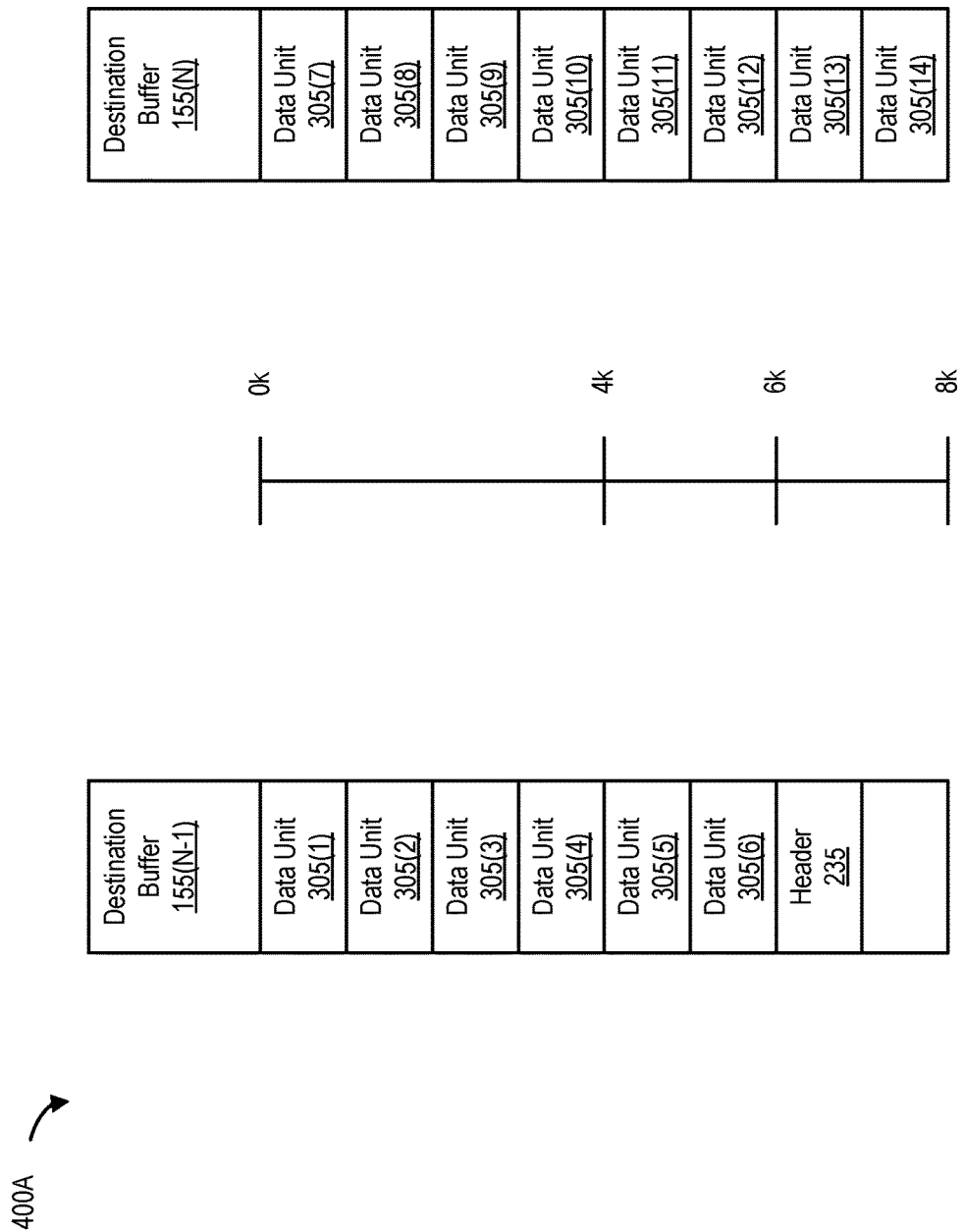

THROUGHPUT IN OPENFABRICS ENVIRONMENTS

FIELD OF THE DISCLOSURE

This disclosure relates to throughput. In particular, this disclosure relates to improving throughput in OpenFabrics computing environments.

DESCRIPTION OF THE RELATED ART

OpenFabrics Enterprise Distribution (OFED™) is open-source computing technology for Remote Direct Memory Access (RDMA) and kernel bypass applications. OFED can be used in computing environments that require highly efficient networks, storage connectivity, and parallel computing. OFED provides kernel-level drivers, RDMA send/receive operations, services for parallel message passing (MPI), kernel bypasses of an operating system (OS), and kernel and user-level application programming interfaces (APIs). Therefore, OFED can be used for applications that require high efficiency computing, wire-speed messaging, microsecond latencies, and fast input/output (I/O) for storage and file systems.

RDMA involves direct memory access (DMA) from the memory of one computing system into that of another computing system without involving either computing system's OS. In addition to other features, RDMA provides remote direct memory access, asynchronous work queues, and kernel bypass. RDMA permits increased throughput and low latency.

OFED APIs can accept input parameters (e.g., in the form of a header and one or more data packets). Because the header is typically small in size (e.g., compared to the data), it is efficient to coalesce the data and the header to minimize the number of RDMA writes. However, coalescing the data and the header, while keeping the data page-boundary-aligned, can result in on-wire wastage (e.g., the amount of data that is sent or transferred over the network).

SUMMARY OF THE DISCLOSURE

Disclosed herein are methods, systems, and processes to improve throughput in OpenFabrics computing environments. One such method involves receiving data and a header, and identifying buffers in which the data and the header are to be written. Placement information for the data and the header is determined based, at least in part, on a size of each buffer, a page-boundary-alignment of the data, and a header alignment of the header. The data and the header are then written to the buffer(s) using the placement information. In this example, data is written on page boundaries and the header is written on a header boundary.

In certain embodiments, using the placement information results in the utilization of a minimum number of buffers and the data being page-boundary-aligned when written to the minimum number of buffers, as well as minimal (or zero) on-wire wastage. The placement information includes instructions to write the data and the header to a second to last buffer.

In some embodiments, the header and the data is coalesced (combined) into a Remote Direct Memory Access (RDMA) write by mapping the header and the data contained in multiple source buffers to one (or more) destination buffers based on the placement information. The RDMA write, which includes and is accompanied by a 32-bit data space containing metadata, is sent or transmitted to a destination along with the placement information.

In other embodiments, if the data cannot be page boundary aligned in the minimum number of buffers, one or more additional buffers can be selected. In this example, the buffers include multiple destination buffers, and the minimum number of buffers include one or more destination buffers.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects and features made apparent to those skilled in the art by referencing the accompanying drawings.

FIG. 4A is a block diagram of a header that is written at the end of an alignment in a second to last buffer, according to one embodiment of the present disclosure.

Figure 1:
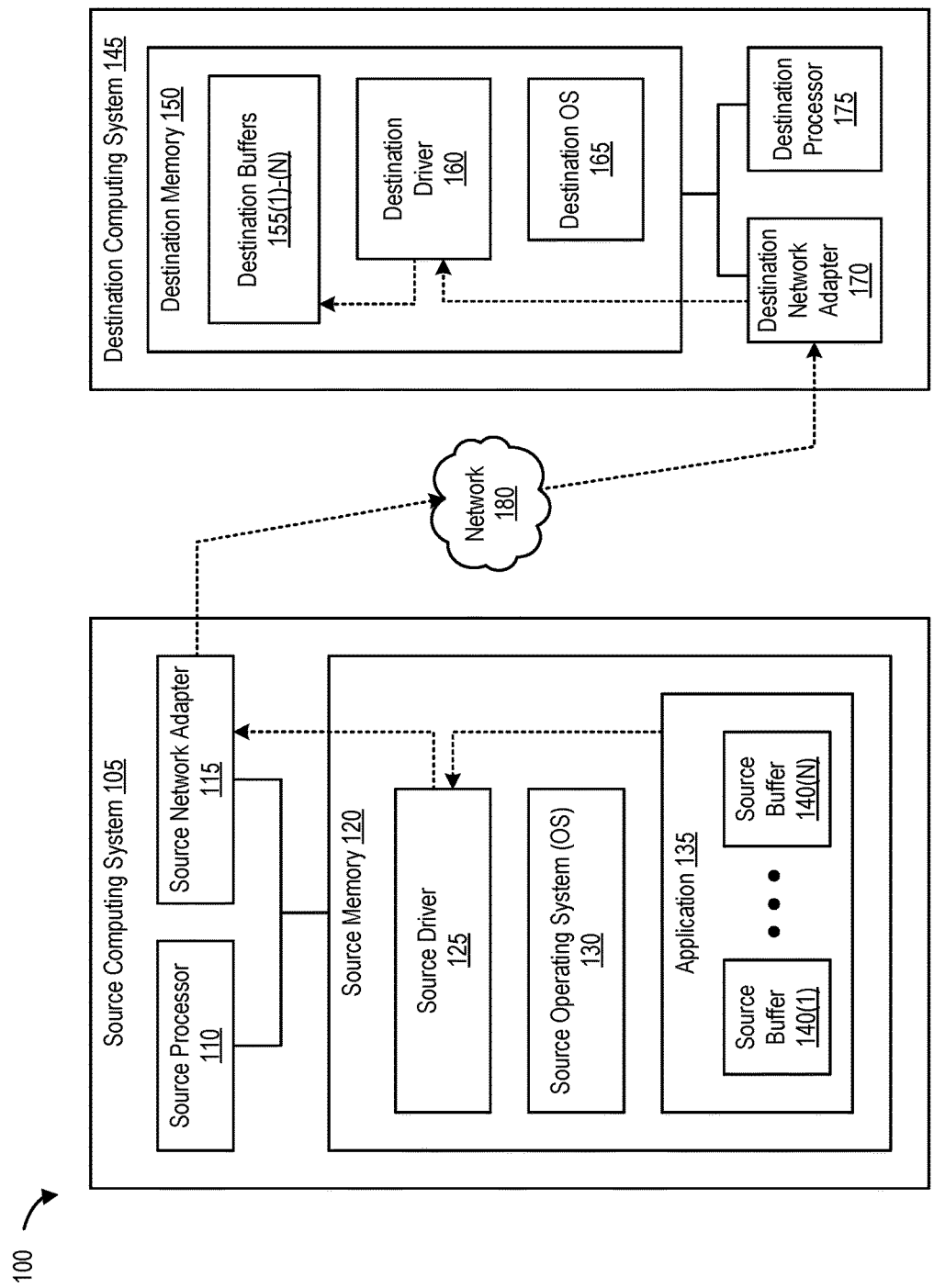
FIG. 1 is a block diagram of a OFED computing system, according to one embodiment of the present disclosure.

While the disclosure is susceptible to various modifications, specific embodiments of the disclosure are provided as examples in the drawings and detailed description. The drawings and detailed description are not intended to limit the disclosure to the particular form disclosed. Instead, the intention is to cover all modifications, equivalents, and alternatives falling within the spirit and scope of the disclosure as defined by the appended claims.

DETAILED DESCRIPTION

Introduction

In certain computing environments, data transfer between two (or more) computing systems can involve sending data and an accompanying header (as well as other metadata) directly from the memory of one computing system (e.g., from multiple source buffers) to the memory of another computing system (e.g., to one or more destination buffers). Because a header is typically small in size (e.g., 1 k), performing a write operation solely to transfer the header from the memory of one computing system to the memory of another computing system is inefficient, not to mention resource intensive.

Therefore, it can be advantageous to coalesce (or combine) data and the header to reduce the number of write operations performed and improve application throughput. As part of the coalescing, data and a header contained in multiple source buffers can be mapped to a single destination buffer (or multiple destination buffers). This placement (or mapping) information can then be transmitted from source buffers to one or more destination buffers along with the data and the header as part of a single write operation.

An example of a system in which the aforementioned approach can be used advantageously is a system that implements Open Fabrics Enterprise Distribution (OFED™) (or OpenFabrics Software (OFS)). OFED is open-source software for Remote Direct Memory Access (RDMA) and kernel bypass applications. OFED can be implemented in computing environments that require highly efficient networks, storage connectivity, and parallel computing. Among other features, OFED provides kernel-level drivers, channel oriented RDMA and send/receive operations, kernel bypasses of an operating system (OS), and kernel and user-level application programming interfaces (APIs) (e.g., OFED API for RDMA transfer). OFED also provides services for parallel message passing (MPI), sockets data exchange (e.g., Session Description Protocol (SDP)), Network Attached Storage (NAS) and Storage Area Network (SAN) storage, and file systems.

RDMA involves direct memory access (DMA) from the memory of one computing system (e.g., a source computing system) into that of another computing system (e.g., a destination computing system) without involving either the source or destination computing system's OS. For example, a network adapter of the source computing system can send a message to the network adapter of the destination computing system that permits the network adapter of the destination computing system to directly access data to (or from) the destination computing system's memory.

A message in RDMA can include at least two types of messages. The first type is an RDMA write. An RDMA write includes an address and data to put (or write) at that address. The RDMA write permits the network adapter that receives the RDMA write to write (or put) the supplied data at the specified address. The second type is an RDMA read. An RDMA read includes an address and a length. The RDMA read permits the network adapter that receives the RDMA read to generate a reply that sends back the data at the address requested. In RDMA, both these types of messages are "one-sided"—the messages are processed by the network adapter that receives them without involving the central processing unit (CPU) on the computing system that receives the messages.

In certain computing systems, network adapters can be accessed via an asynchronous interface (also called a "verbs" interface). To use a network adapter (e.g., to perform RDMA operations), objects called queue pairs (or QPs) can be created. QPs involve a pair of work queues—a send queue and a receive queue, as well as completion queues (CQs). An RDMA operation can be posted to a work queue (e.g., as a request). The RDMA operation is then executed synchronously and when completed, the network adapter adds work completion information to the end of the CQ. Completion information can then be retrieved from the CQ to determine which requests have been completed. Operating asynchronously in this manner makes it easier to overlap computation and communication in RDMA computing environments.

It should be noted that RDMA-enabled network adapters also support "two-sided" send/receive operations, in addition to one-sided RDMA operations. In addition, it will be appreciated that network adapters in RDMA computing environments can also permit userspace processes to perform fast-path operations (e.g., posting work requests and retrieving work completions) directly with the hardware without involving the kernel (thus saving time associated with system call overhead). Therefore, RDMA permits high-throughput and low-latency networking (e.g., which is especially useful in parallel computing clusters).

As previously noted, OFED provides APIs for RDMA data transfer. If OFED APIs are used for RDMA data transfer, a client's message will include a header and one or more data packets. Because the size of the header is typically small compared to the size of the data, it is not efficient to write the data and the header independently (e.g., as two separate RDMA writes). The data and the header can be coalesced (or combined) (e.g., as part of a single RDMA write) to reduce the total number of RDMA writes.

The OFED API also provides a 32-bit data space for private use (also called 32-bit immediate data or private data) as part of each RDMA write. This 32-bit data space can be used to store buffer location information as well as other metadata associated with the RDMA write, in addition to information associated with a header itself (e.g., a header offset indicating the location of the header on a header boundary).

Unfortunately, coalescing (combining) data and a header (e.g., by mapping source buffers to destination buffers) for RDMA data transfer poses several challenges. First, applications (e.g., one or more applications executing on destination computing system 145) require data to be page boundary aligned. For example, a computing system reads or writes data to a memory address in word sized chunks (e.g., 4 byte chunks on a 32-bit system) or larger.

Page boundary alignment (or data structure alignment) involves writing data at a memory address equal to some multiple of the word size so as to increase the computing system's performance (e.g., due to the way certain memory management systems manage memory). To page boundary align the data, it may be necessary to insert (or treat) some bytes as meaningless ("don't care") (referred to as wastage) between the end of the last data structure and the start of the next data structure (e.g., padding). Therefore, the requirement that data remain page boundary aligned can result in wastage that is unnecessarily and redundantly sent on-wire (e.g., transmitted over the network as part of the RDMA data transfer).

Second, coalescing data and a header can result in additional redundant RDMA writes (e.g., one or more additional destination buffer(s) may be required to write the header at the start of a header boundary, to maintain page boundary alignment, and the like). Therefore, minimizing the number of destination buffers that are used (or RDMA writes that are performed) to write the data and the header is also an important consideration.

Third, and as noted, systems such as those implementing OFED employ (or can be modified to employ) the OFED API which provides for a 32-bit informational storage area as part of an RDMA write, for example, to maintain buffer location information, RDMA write metadata, header location information, and the like. Because only a few bits of the 32-bits of data space are available to maintain header location information (e.g., a header offset), the placement of the header is also another important consideration (and limitation) when coalescing data and the header in such systems.

Disclosed herein are methods, systems, and processes to coalesce data and a header and improve throughput in systems such as OFED RDMA computing systems while efficiently utilizing the provided 32-bit data space, minimizing the number of RDMA writes (e.g., reducing the number of destination buffers used to write data and the header), maintaining page boundary alignment of data, and minimizing on-wire wastage.

Example Implementation in a Computing System

FIG. 1 is a block diagram of a computing system that implements and uses RDMA technology, according to one embodiment. The computing system of FIG. 1 includes a source computing system 105 and a destination computing system 145 communicatively coupled via a network 180. Network 180 can include any type of network or interconnection (e.g., the Internet, a Wide Area Network (WAN), a SAN, and the like).

Source computing system 105 includes a source processor 110 and a source network adapter 115. Source processor 110 and source network adapter 115 are communicatively coupled to a source memory 120. Source memory 120 includes a source driver 125, a source OS 130, and an application 135, which implements source buffers 140(1)-(N). Similarly, destination computing system 145 includes a destination processor 175 and a destination network adapter 170 communicatively coupled to a destination memory 150. Destination memory 150 includes destination buffers 155(1)-(N), a destination driver 160, and a destination OS 165.

The computing system of FIG. 1 permits remote direct memory access from source memory 120 of source computing system 105 into that of destination computing system 145 without involving source OS 130 or destination OS 165 (and vice-versa). For example, source network adapter 115 of source computing system 105 can send a message (e.g., a client message) to destination network adapter 170 of destination computing system 145 that permits destination network adapter 170 of destination computing system 145 to directly access data to (or from) destination memory 150 (and vice-versa).

In some embodiments, source network adapter 115 and destination network adapter 170 permit userspace processes (on source computing system 105 and destination computing system 145, respectively) to perform RDMA operations (or other buffer-based operations amendable to methods such as those described herein) by bypassing their respective kernels and avoiding a system call (e.g., by bypassing source OS 130 and destination OS 165 as shown in FIG. 1). RDMA operations can be managed and facilitated using an OFED API.

Figure 2:
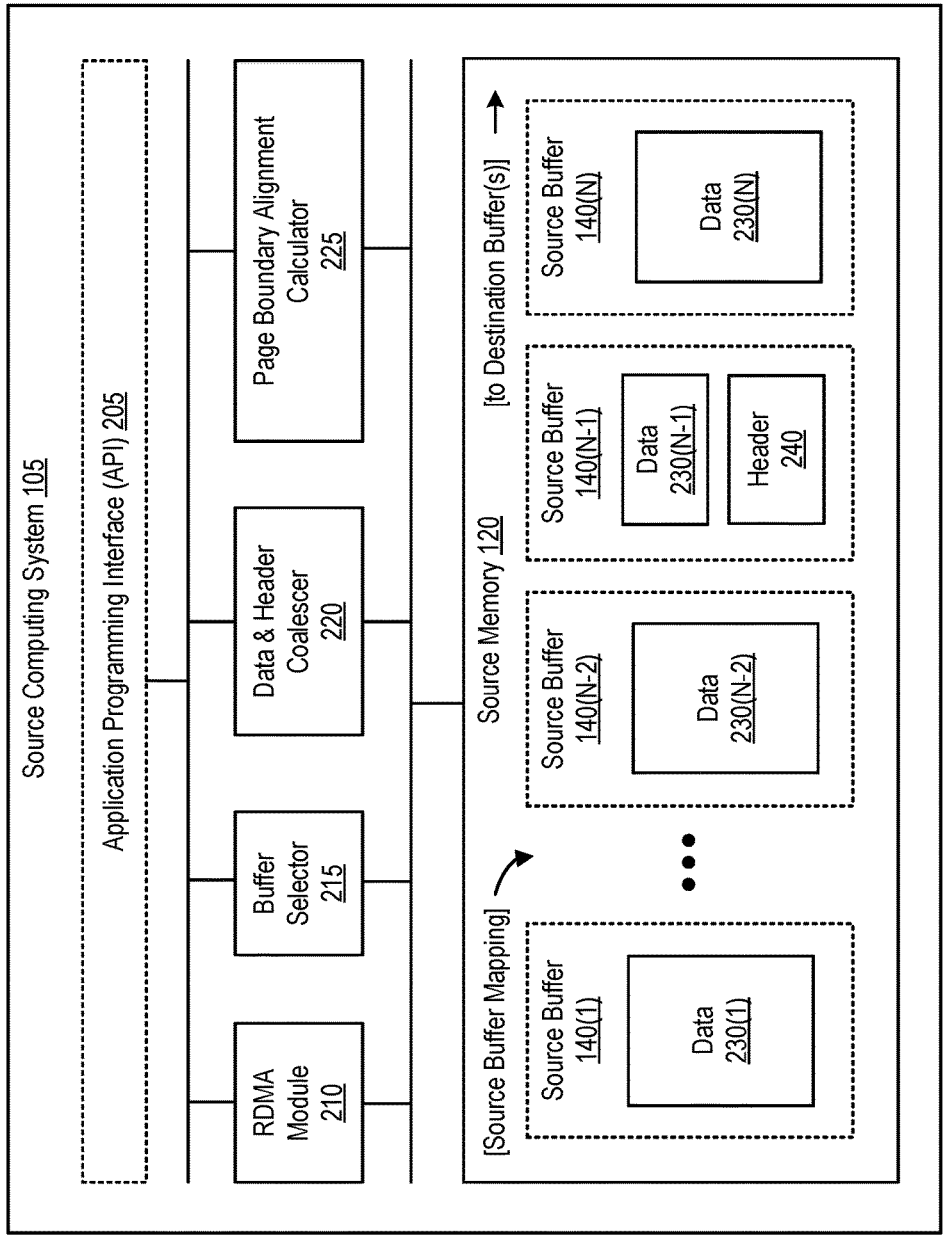
FIG. 2 is a block diagram of a source computing system that implements an OFED API, according to one embodiment of the present disclosure.

FIG. 2 is a block diagram of a source computing system that implements the OFED API, according to one embodiment. As shown in FIG. 2, source computing system 105 includes an Application Programming Interface (API) 205, such as the OpenFabrics Enterprise Distribution (OFED™) API. Source computing system 105 also includes an RDMA module 210, a buffer selector 215, a data and header coalescer 220, and a page boundary alignment calculator 225. It should be noted that RDMA module 210 (or other comparable support module), buffer selector 215, data and header coalescer 220, and page boundary alignment calculator 225 can be implemented as hardware or software, and as part of source computing system 105 or separately (e.g., as part of an RDMA server, a software appliance, a virtual machine, or some other type of computing device).

Source computing system 105 also includes source memory 120. Source memory 120 includes source buffers 140(1)-(N). Each source buffer contains data, or a combination of data and a header. For example, as shown in FIG. 2, and as mapped by RDMA module 210 to destination buffers, source buffer 140(1) contains data 230(1) (e.g., with one or more data units), source buffer 140(N−2) contains data 230(2), source buffer 140(N−1) (e.g., the second to last buffer) includes data 230(N−1) and a header 240, and source buffer 140(N) contains data 230(N).

RDMA module 210 manages, facilitates, coordinates, and performs one or more RDMA operations. For example, RDMA module 210 can perform an RDMA write operation or an RDMA read operation. Buffer selector 215 selects one or more buffers (e.g., destination buffers 155(1)-(N)) to fill with (or write) data, or data and a header. Data and header coalescer 220 maps source buffers to destination buffers by coalescing (or combining) data and a header (e.g., in a single buffer (e.g., destination buffer 140(N−1)) as part of a single RDMA write/packet). Finally, page boundary alignment calculator 225 determines the placement of data in destination buffers 155(1)-(N) such that the data is page boundary aligned.

In conjunction, RDMA module 210, buffer selector 215, data and header coalescer 220, and page boundary alignment calculator 225 determine the placement of data and the header among one or more (available) buffers (e.g., destination buffers 155(1)-(N)) so as to improve throughput in OFED-based RDMA computing environments.

Examples of Writing Data and a Header

In one embodiment, source computing system 105 receives a header and data (e.g., contained in one or more source buffers and/or from an application executed by one or more hosts, servers, and the like). Buffer selector 215 identifies destination buffers in which the data and the header are to be written (e.g., destination buffers 155(1)-(N)). Data and header coalescer 220 then determines the (appropriate) mapping and placement of the data and the header.

In some embodiments, the determination of the mapping and placement of the data and the header is based on at least three factors. First, the determination of the placement of the data and the header is based on utilizing a minimum number of destination buffers (e.g., so as to reduce the number of RDMA writes). Second, the determination of the placement of the data and the header is based on the data being page boundary aligned (in the minimum number of destination buffers). Third, the determination of the placement of the data and the header is based on the placement minimizing on-wire wastage (e.g., reducing the amount of wastage (or padding) that is sent over the network). Based on at least these three factors, RDMA module 210 writes the data and the header to the destination buffers (e.g., data is written on page boundaries and the header is written on a header boundary).

In other embodiments, RDMA module 210 generates an RDMA write. The RDMA write includes the header and the data coalesced into a single RDMA packet (e.g., using data and header coalescer 220). In certain embodiments, the RDMA write is accompanied by a 32-bit data space (e.g., the 32-bit data space is not part of client data space), and is transmitted using RDMA to destination computing system 145. In this example, the 32-bit data space is used to include an offset of the header (e.g., as part of writing the data and the header to destination buffers).

In other embodiments, buffer selector 215 determines the minimum number of buffers that are required for the data and the header based on a size of each buffer. Buffer selector 215 selects one or more additional buffers if the data cannot be page boundary aligned in the minimum number of buffers. In certain embodiments, each buffer is a destination buffer, and the OFED API permits mapping of multiple source buffers to a single destination buffer.

Examples of Coalescing Data and a Header

Figure 3A:
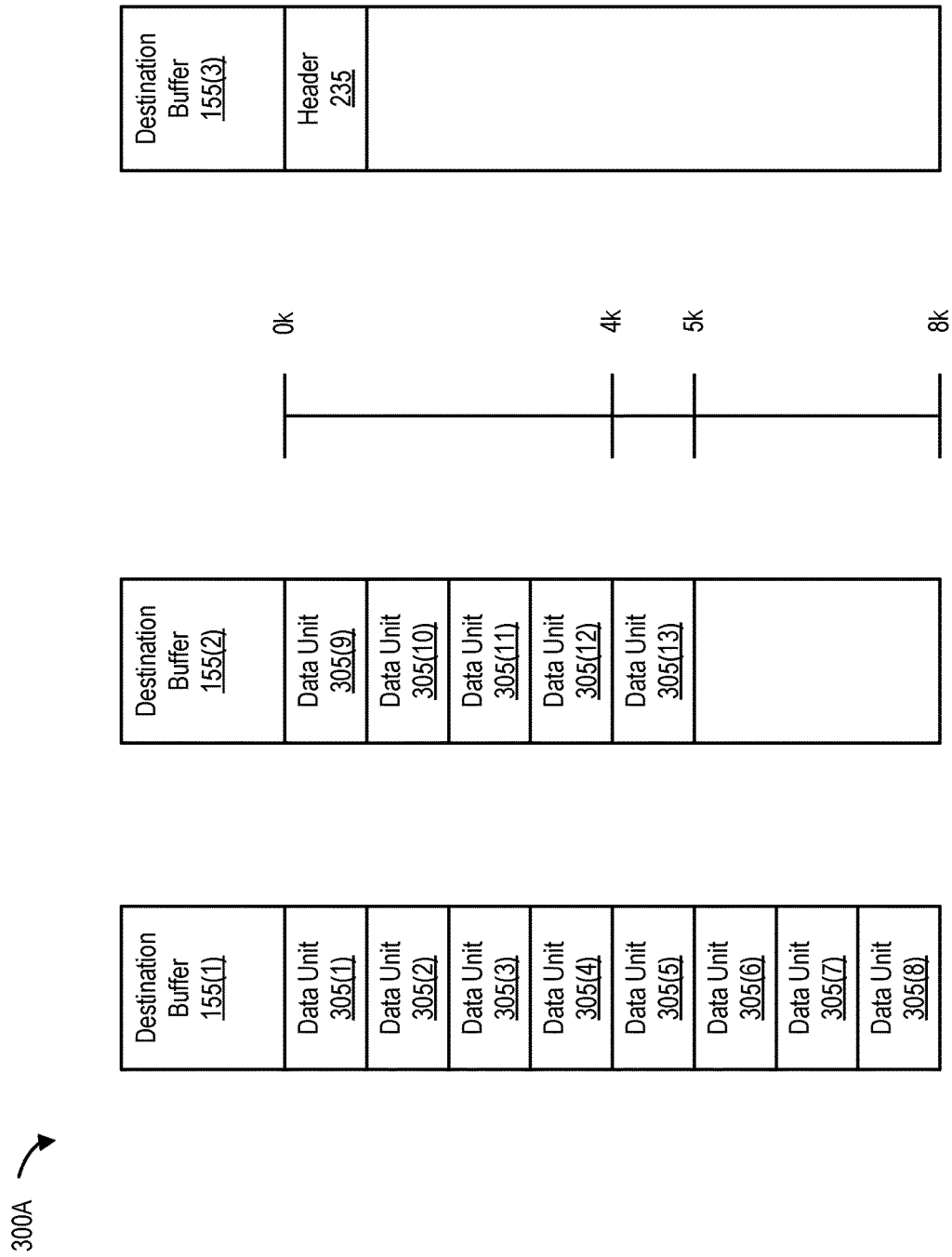
FIG. 3A is a block diagram of data units and a header that are not coalesced, according to one embodiment of the present disclosure.

FIG. 3A is a block diagram of data units and a header that are not coalesced, according to one embodiment. It should be noted that for the sake of illustration, the size of source buffers 140(1)-(N) (as well as the size of the receive/destination buffers 155(1)-(N)) in FIGS. 3A-3E and 4A-4C is 8 k and the data is 4 k aligned. However, in alternate implementations and embodiments, source buffers 140(1)-(N) and destination buffers 155(1)-(N) can be any size (e.g., 16 k, 32 k, and the like), and the page boundary alignment of the data can also differ (e.g., the data can be 2 k, 3 k, or 6 k aligned).

As shown in FIG. 3A, in some embodiments, data (e.g., data units 305(1)-(13)) and a header (e.g., header 235) are not coalesced (e.g., not combined into a single destination buffer or a single RDMA write). In this example, the data is 13 k (e.g., data units 305(1)-(13)) and the header is 1 k (e.g., header 235). The data (e.g., 13 k of data that is 4 k page boundary aligned) requires (and uses) two buffers (e.g., destination buffers 155(1) and 155(2) as shown in FIG. 3A). If the data and the header are not coalesced, header 235 will require a separate and additional buffer (e.g., destination buffer 155(3)). Therefore, although there is no on-wire wastage, the RDMA write operation would consume three destination buffers. Consequently, three RDMA writes would be required as part of the RDMA transfer of the data and the header.

Figure 3B:
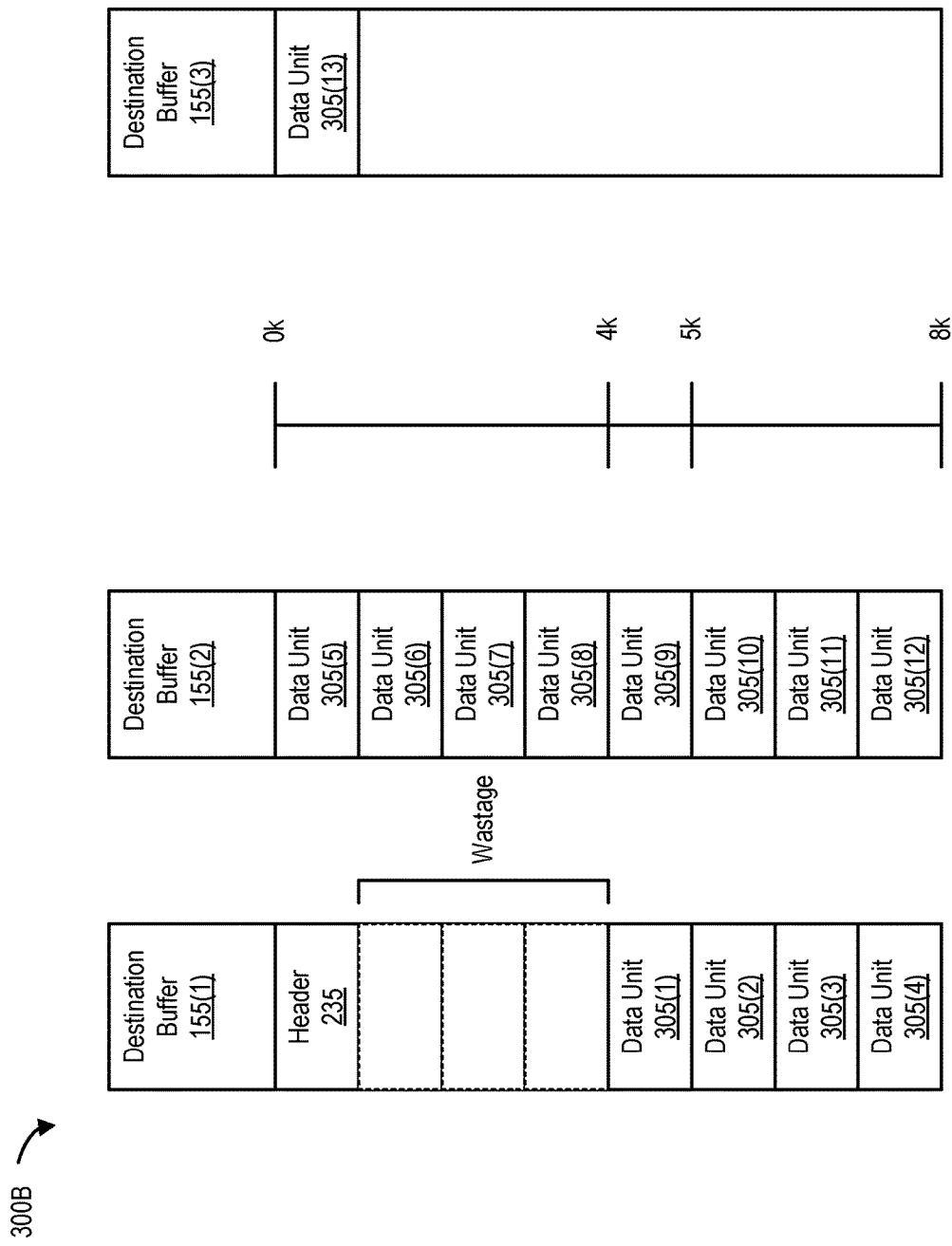
FIG. 3B is a block diagram of a header that is written at the start of a buffer, according to one embodiment of the present disclosure.

FIG. 3B is a block diagram of a header that is written at the start of a buffer, according to one embodiment. In some embodiments, the header (e.g., header 235) is written at the start of a buffer (e.g., destination buffer 140(1)). But as previously noted, applications in RDMA computing environments typically require the data to be written at a page boundary (e.g., at 0 k or 4 k in an 8 k buffer, if the data is 4 k page boundary aligned).

Consequently, as shown in FIG. 3B, writing the header at the start of a buffer can cause wastage on-wire between the end of the header and the start of the data, because the data has to start at a page aligned boundary (e.g., data unit 305(1) has to start at the 4 k page boundary), and the number of buffers required has also not been reduced (e.g., three buffers).

Figure 3C:
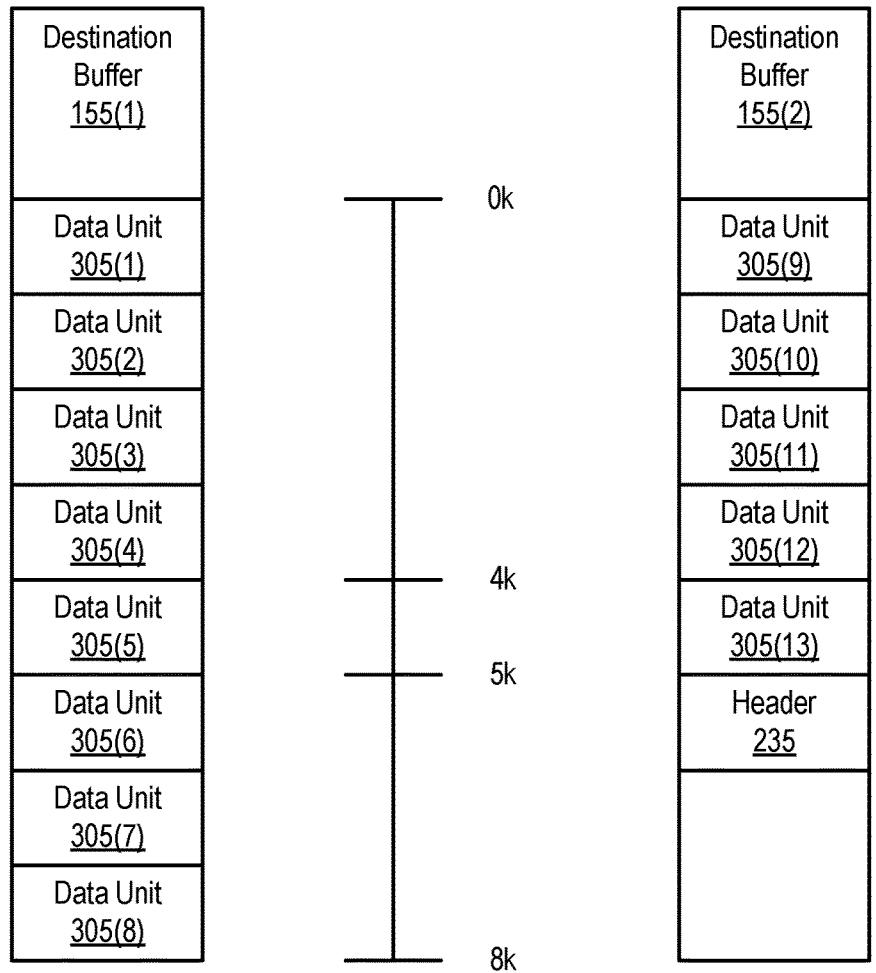
FIG. 3C is a block diagram of a header that is written immediately after data, according to one embodiment of the present disclosure.

FIG. 3C is a block diagram of a header that is written immediately after data, according to one embodiment. In this example, writing 13 k of data (e.g., data units 305(1)-(13)) requires two buffers (e.g., destination buffers 155(1) and 155(2)). In some embodiments, header 235 is written immediately after the data (e.g., after data unit 305(13)). As previously noted, the OFED API provides programmers a 32-bit space with every RDMA write for private use. Destination computing system 145 can use this 32-bit value to locate appropriate buffer(s) and use information regarding the buffer(s) (e.g., the RDMA write) for further processing.

However, using OFED-based RDMA computing environments as an example, a part of this 32-bit data space is also required to indicate the exact header offset in a particular buffer. In the example of FIG. 3C, if header 235 is written immediately after the data (e.g., an 8 byte alignment for an 8 k buffer), representing the header offset will require more space (e.g., 10 bits) than is available from the 32-bit data space of immediate data. Unfortunately, in many scenarios such as the foregoing, finding 10 (free) bits in an already-crowded 32-bit data space may not be possible. Therefore, although the header and data placement in the example of FIG. 3C results in zero wastage on-wire and uses the minimum number of destination buffers, such a solution may not be feasible because representing the header offset (e.g., particularly if the header is not written at a header boundary) requires too many bits from the 32-bit data space.

Figure 3D:
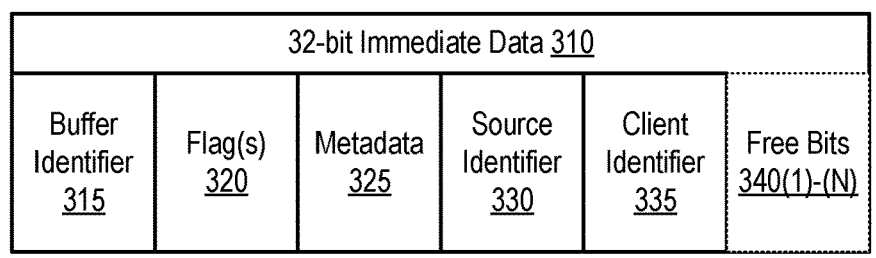
FIG. 3D is a block diagram of a 32-bit data space provided by the OFED API, according to one embodiment of the present disclosure.

FIG. 3D is a block diagram of a 32-bit data space provided by the OFED API, according to one embodiment. As shown in FIG. 3D, 32-bit immediate data 310 contains information including a buffer identifier 315, flag(s) 320, metadata 325, a source identifier 330, a client identifier 335, and free bits 340(1)-(N) (e.g., available for header offset representation). Information regarding the buffer identifier, flag(s), metadata, source identifier and client identifier, in addition to other information, takes up most of the space (e.g., bits) of 32-bit immediate data 310. Therefore, free bits 340(1)-(N) represent a small number of bits available for header offset representation. Consequently, to accurately represent the header offset information in the available space (e.g., free bits), in some embodiments, the header is written at a header boundary (e.g., so that the header offset information can be fully and accurately represented using free bits 340(1)-(N)).

Figure 3E:
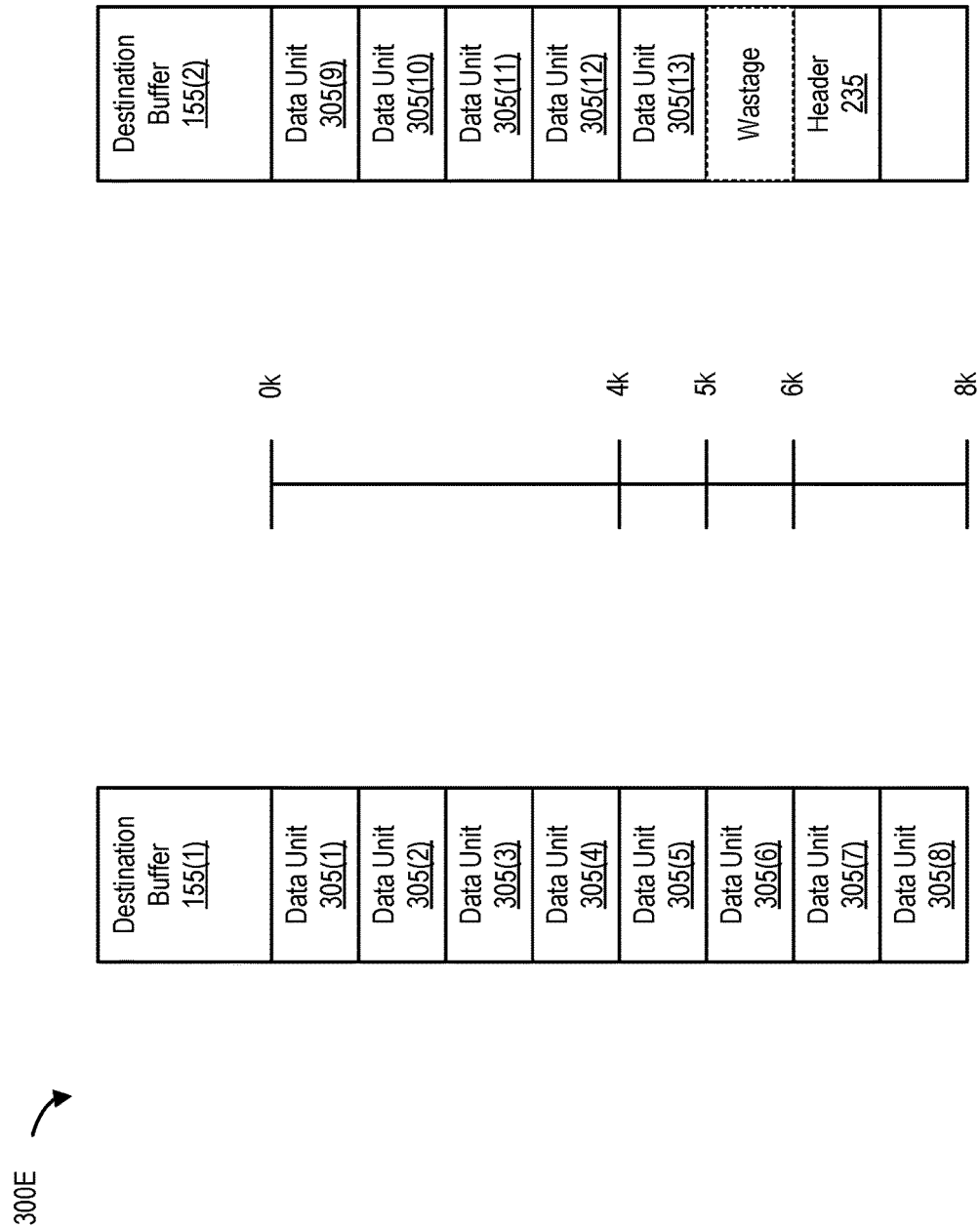
FIG. 3E is a block diagram of a header that is written at the end of an alignment, according to one embodiment of the present disclosure.

FIG. 3E is a block diagram of a header that is written at the end of an alignment, according to one embodiment. As shown in FIG. 3E, and in certain embodiments, header 235 is written at the end of a particular alignment (e.g., at the end of a 2 k alignment) and at a header boundary (e.g., at 6 k in an 8 k buffer). In this example, the alignment of header 235 is determined based on the number of bits that would potentially be available (e.g., for header placement) if the data were to be written (e.g., to one or more buffers like destination buffers 155(1) and 155(2)). The more free bits that are available, the lesser the wastage.

For example, if only two bits are available for alignment in FIG. 3E, the header (e.g., aligned at 2 k) can be placed at (or written to) four possible offsets (e.g., 0 k, 2 k, 4 k, and 6 k in an 8 k buffer). In this example, the maximum possible on-wire wastage is 2 k. However, if three bits are available for alignment in FIG. 3E, the header (e.g., aligned at 1 k) can be placed at (or written to) eight possible offsets, thus reducing the maximum possible on-wire wastage to 1 k. Therefore, writing a header at the end of an alignment as shown in FIG. 3E also produces some wastage, however minimal (e.g., as compared to writing the header at the beginning of a buffer as shown in FIG. 3A).

Examples of Header and Data Placement

FIG. 4A is a block diagram of a header that is written at the end of an alignment in a second to last buffer, according to one embodiment. As shown in FIG. 4A, and in some embodiments, header 235 is written in a second to last buffer (e.g., destination buffer 140(N−1)) at the last (available) header-aligned offset (e.g., of destination buffer 155(N−1)) (e.g., 6 k), based on the header size (e.g., 1 k as shown in FIG. 4A) and alignment (e.g., based on a header boundary). In certain embodiments, buffer selector 215 identifies destination buffer 155(N−1) as the second to last buffer, and selects destination buffer 155(N−1) for header placement. Page boundary alignment calculator 225 then calculates the page boundary alignment of data that can be written to destination buffer 155(N−1) (e.g., data units 305(1)-305(6)), while data and header coalescer 220 ensures that enough space is available for header placement (e.g., 1 k), header representation (e.g., in 32-bit immediate data 310), and header alignment (e.g., at 6 k).

Figure 4B:
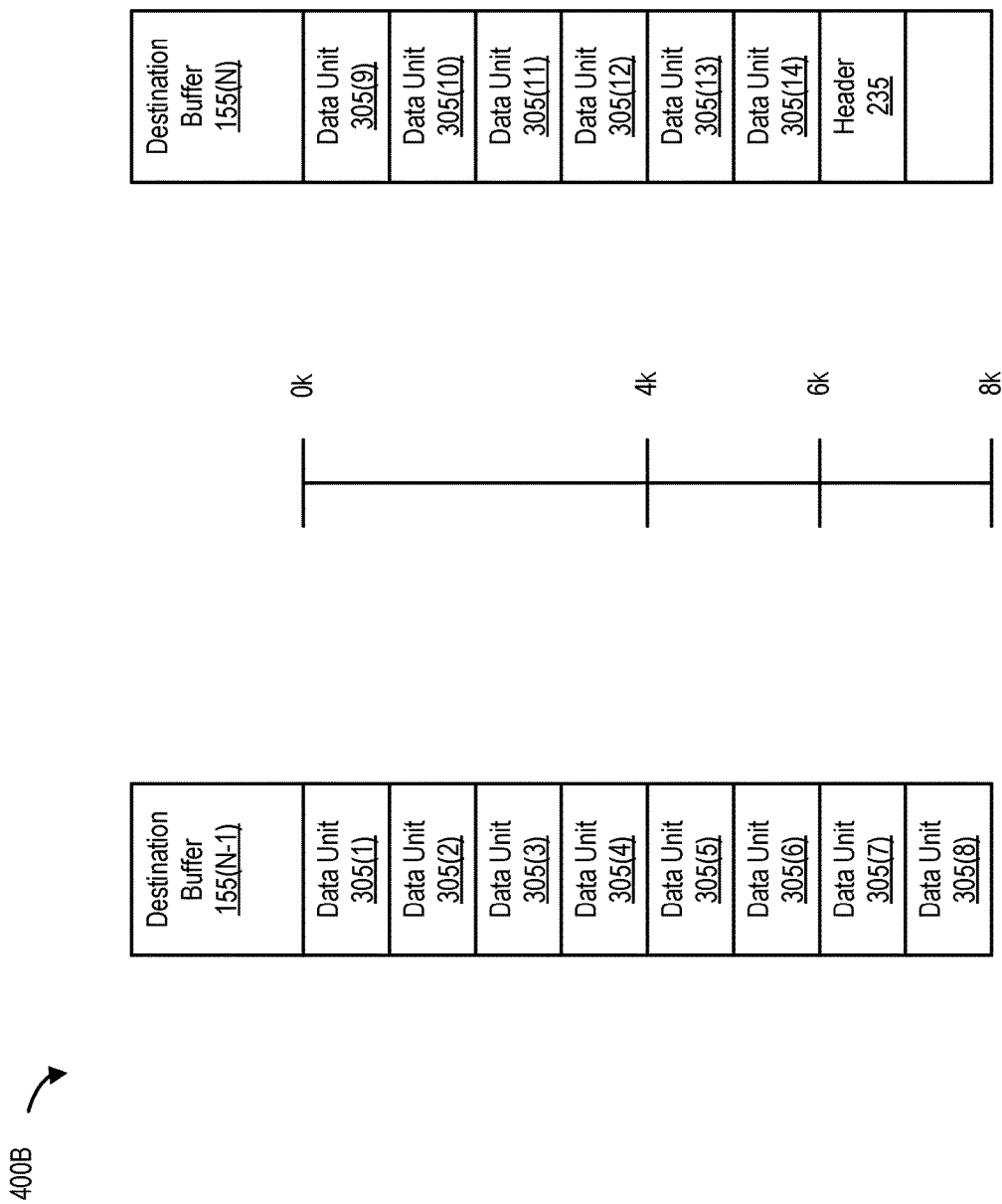
FIG. 4B is a block diagram of a header that is written at the end of an alignment without additional buffers, according to one embodiment of the present disclosure.

Therefore, as shown in FIG. 4A, and in some embodiments, writing a header at the end of an alignment in a second to last buffer results in zero wastage on-wire and also does not require additional buffers. FIG. 4B is a block diagram of a header that is written at the end of an alignment without (requiring) additional buffers, according to other embodiments. For example, if the available space (e.g., bits) in a buffer (e.g., after data is written) permit a 2 k header alignment (e.g., so as to be able to capture the header offset in the smallest amount of bites possible), writing header 235 at the end of an alignment (e.g., in destination buffer 155(N)) permits more data to be written than would otherwise be possible (e.g., data unit 305(14)). If data is not filled up to the brim (e.g., up to and including data unit 305(14)), a 1 k gap (e.g., on-wire wastage) is introduced. However, in this example, header 235 can be written after the data (e.g., after 14 data units). It will be appreciated that header and data placement in this example causes no wastage on-wire and also does not require additional (destination) buffers.

Figure 4C:
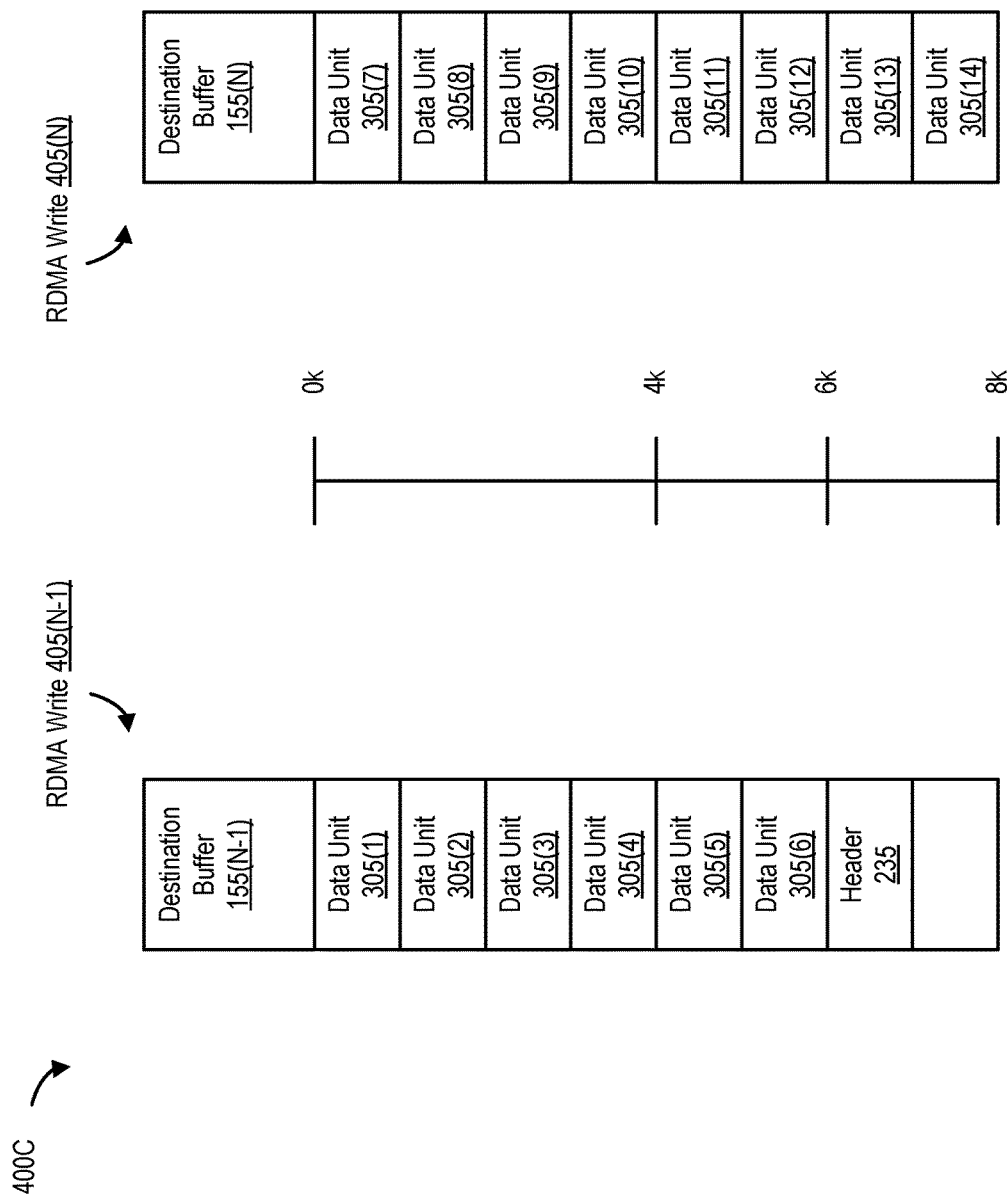
FIG. 4C is a block diagram of a header that is written to a second to last buffer, according to one embodiment of the present disclosure.

Like FIG. 4A, FIG. 4C is a block diagram of a header that is written to a second to last buffer, according to one embodiment. As shown in FIG. 4C, header 235 is written to destination buffer 155(N−1), which is the second to last buffer. Header 235, as required by the need to include the header offset in 32-bit immediate data 310, is header aligned at a header boundary (e.g., at 6 k). The available space in the last buffer is fully filled with data (e.g., data units 305(7)-(14)). Data units 305(1)-(6) are written to destination buffer 155(N−1). The data in both destination buffers 155(N−1) and 155(N) is page boundary aligned and header 235 is also aligned at a header boundary. Therefore, in this example, the minimum number of buffers required to write the data and the header are used, and there is no on-wire wastage.

It will be appreciated that when computing systems such as those described herein (e.g., as shown in FIG. 1) have more than one receive buffer (e.g., destination buffers 155(1)-(N)) and when the total size of the receive/destination buffers is more than the sum of the aligned header and the page boundary aligned data, writing a header at the end of an alignment in a second to last buffer results in the minimum utilization of buffers and reduces (or eliminates) on-wire wastage. It will also be appreciated that, coalescing a header and data in this manner results in increased I/O performance and application throughput.

Example Processes for Coalescing a Header and Data

Figure 5A:
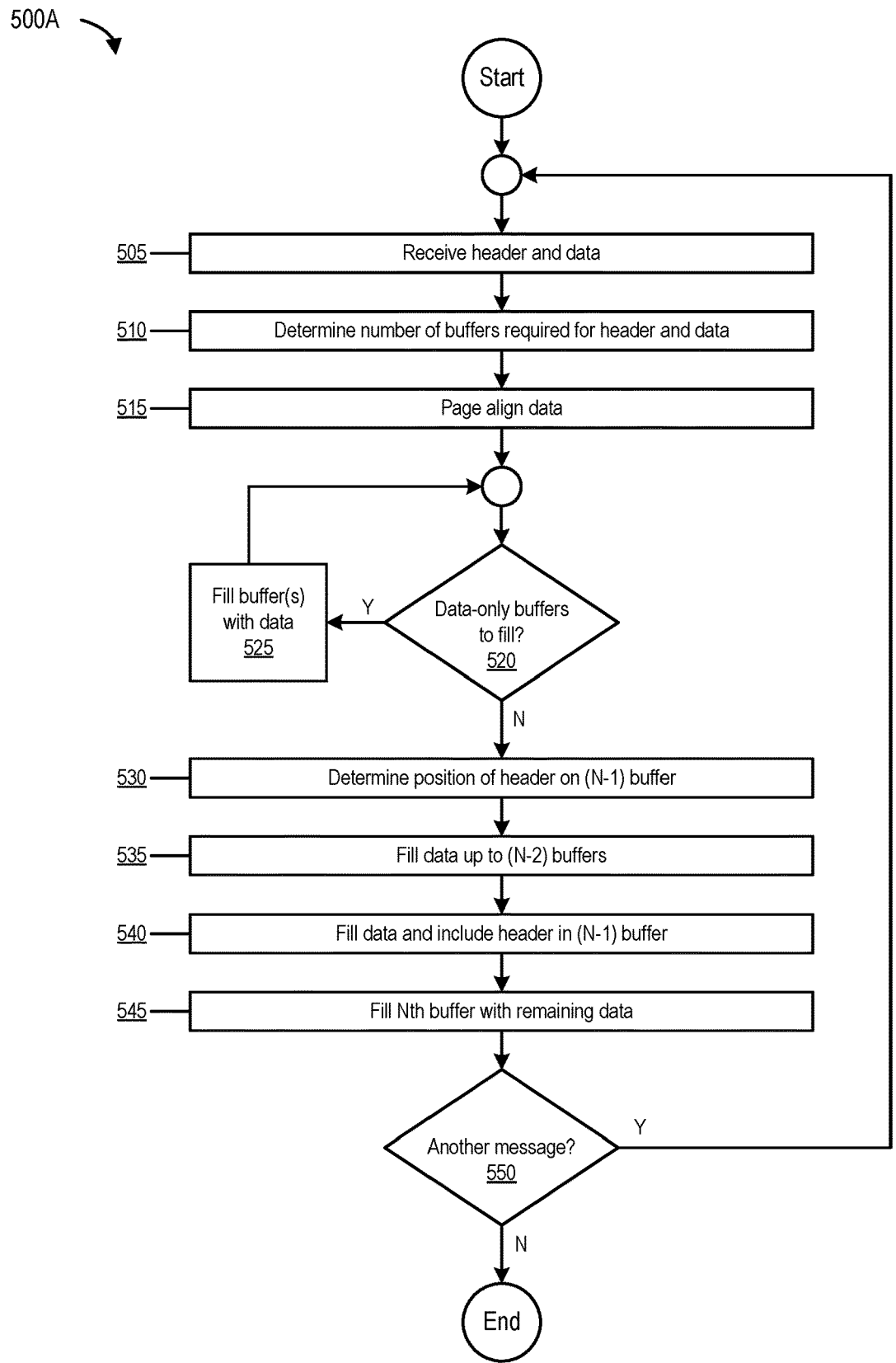
FIG. 5A is a flowchart that illustrates a process for filling buffers with data and a header, according to one embodiment of the present disclosure.

FIG. 5A is a flowchart that illustrates a process for filling buffers with data and a header, according to one embodiment. The process begins at 505 by receiving a header (e.g., header 235) and data (e.g., data units 305(1)-(14)), for example, as an input parameter from a host, a virtual machine, or some other type of computing system communicatively coupled to source computing system 105, or from one or more applications executing on source computing system 105. At 510, the process determines the number of buffers that are required for the header and the data (e.g., by using buffer selector 215 and based on the size of data units received as part of the data). At 515, the process page (boundary) aligns the data (e.g., by using page boundary alignment calculator 225) and records this mapping.

At 520, the process determines whether there are data-only buffers to fill (e.g., write data (units) to). If there are data-only buffers to fill, the process at 525, fills buffer(s) with data (e.g., destination buffers 155(1)-(N−2)). If there are no data-only buffers to fill, the process, at 530, determines the position of the header on the second to last buffer (e.g., destination buffer 155(N−1)). At 535, the process fills the data up to destination buffer 155(N−2). At 540, the process fills the data and the header in destination buffer 155(N−1) (e.g., as shown in FIGS. 4A and 4C). At 545, the process fills the last buffer (e.g., destination buffer 155(N)) with the remaining data. The process ends at 550 by determining if there is another message to process.

Figure 5B:
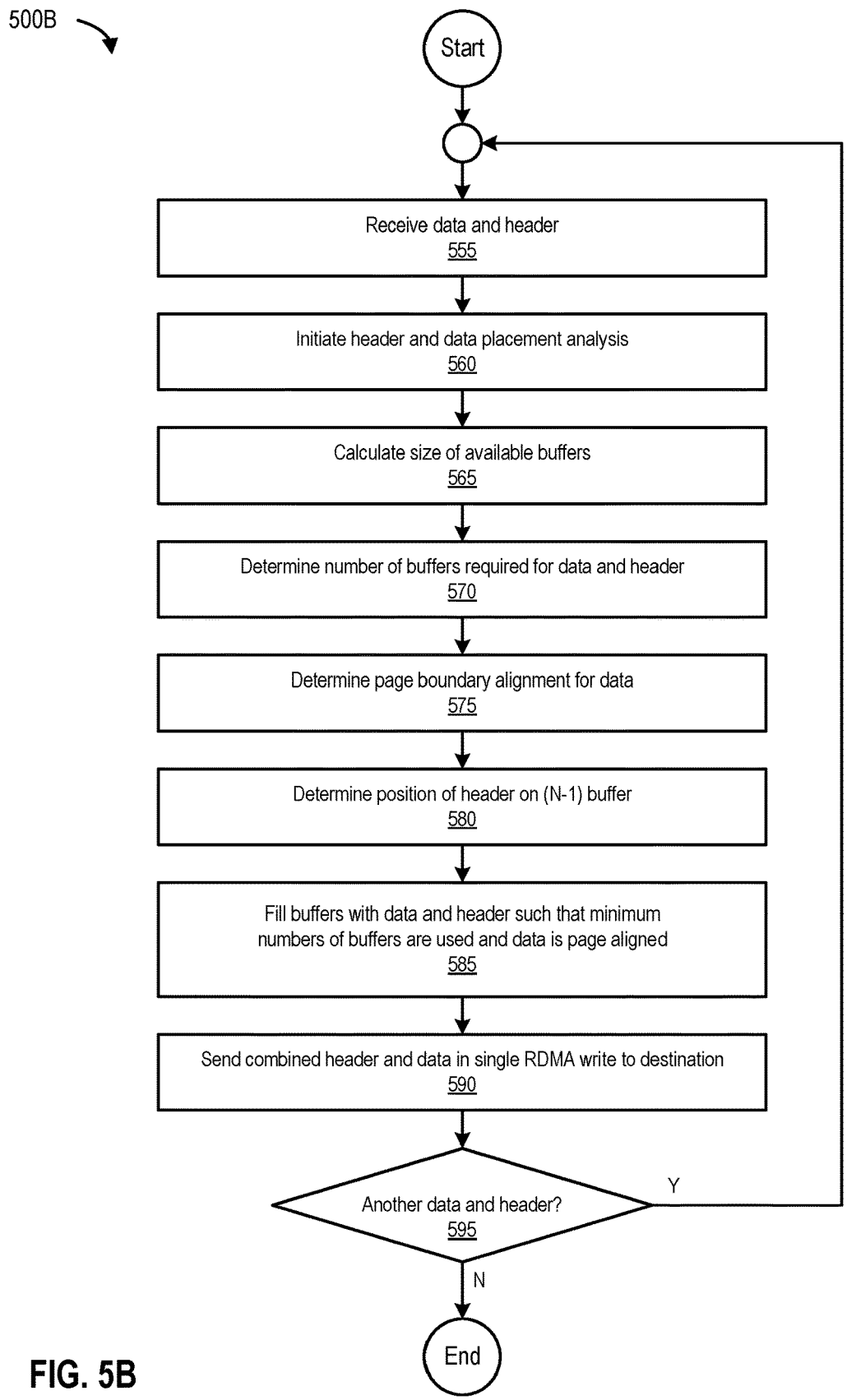
FIG. 5B is a flowchart that illustrates a process for combining a header and data, according to one embodiment of the present disclosure.

FIG. 5B is a flowchart that illustrates a process for combining a header and data, according to one embodiment. The process begins at 555 by receiving data and a header contained in source buffers. At 560, the process initiates header and data placement analysis (e.g., using RDMA module 210). At 565, the process calculates the size of available buffers (e.g., 8 k, 16 k, 32 k, and the like). At 570, the process determines the number (e.g., minimum) of buffers that are required for data and the header (e.g., based on the size of the data units received). At 575, the process determines the page boundary alignment for the data within the identified buffers (e.g., using page boundary alignment calculator 225). It should be noted that page boundary alignment calculator 225 can also determine header boundaries for the header.

At 580, the process determines the position of the header in the second to last buffer (e.g., in destination buffer 155(N−1)). For example, the process can determine the position of header 235 in destination buffer 155(N−1) at the end of page boundary aligned data (e.g., after data unit 305(6) as shown in FIGS. 4A and 4C) and at a header boundary (e.g., starting at 6 k for a 2 k alignment of a 1 k header, also as shown in FIGS. 4A and 4C). At 585, the process fills destination buffers with the data and the header such that the minimum number of destination buffers are utilized and the data is page boundary aligned. At 590, the process sends the combined header and data along with placement/mapping information in a single RDMA write (e.g., a message sent over RDMA) to a destination (e.g., destination computing system 145). The process ends at 595 by determining if there is another header and (more) data to process.

Figure 6:
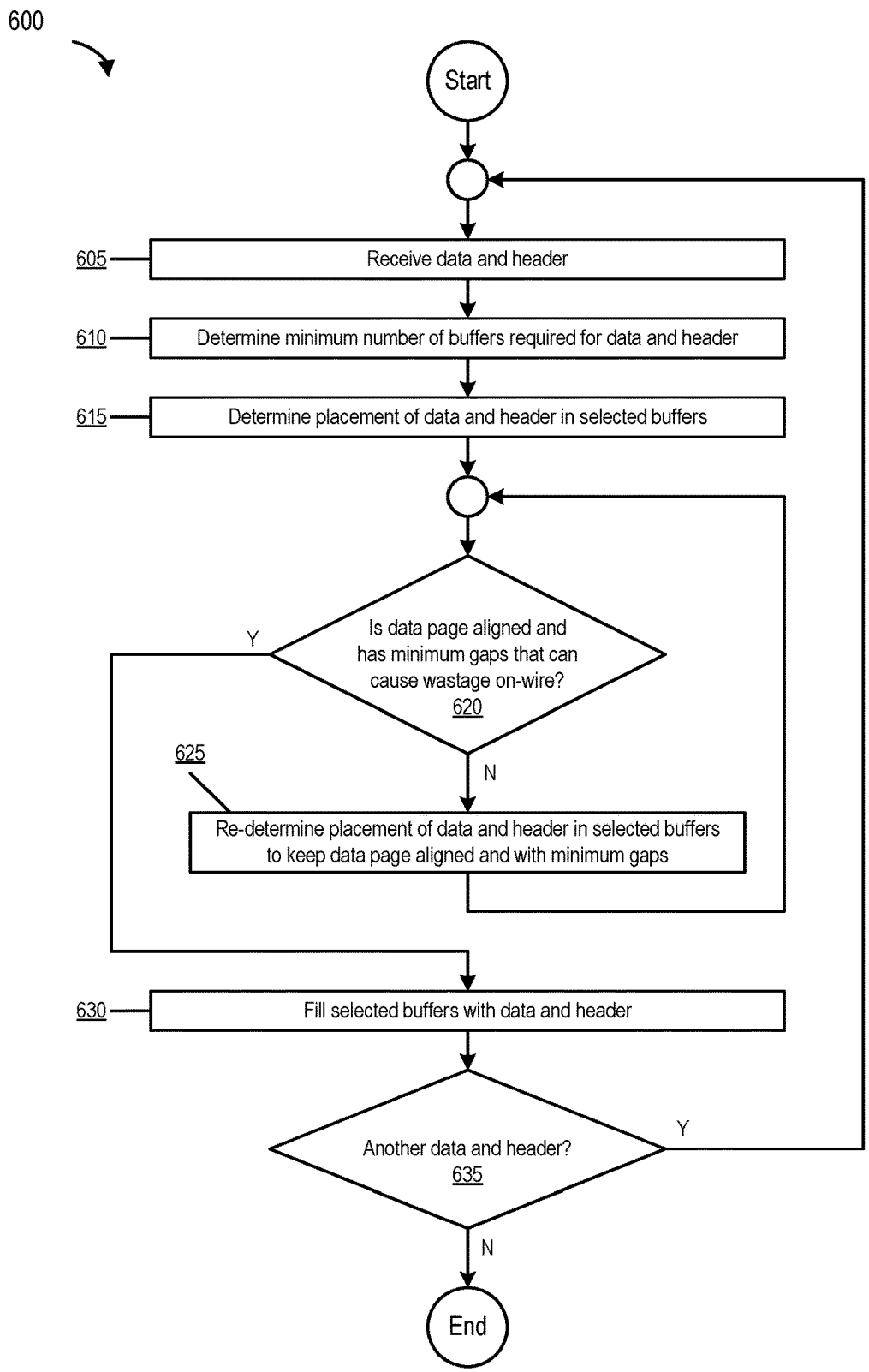
FIG. 6 is a flowchart that illustrates a process for determining placement/mapping information of a header and data, according to one embodiment of the present disclosure.

FIG. 6 is a flowchart that illustrates a process for determining placement/mapping information of a header and data, according to one embodiment. The process begins at 605 by receiving data and a header. At 610, the process determines the minimum number of buffers required to write the data and the header. At 615, the process determines the placement of the data and the header in selected buffers. At 620, the process determines whether the data is page boundary aligned and whether the data has a minimum number of gaps that can cause on-wire wastage. If the data is not page boundary aligned or the data does not have a minimum number of gaps (or zero gaps) that can cause on-wire wastage, the process, at 625, re-determines placement of the data and the header in the selected buffers to keep the data page boundary aligned and with minimum (or zero) gaps. However, if the data is page boundary aligned and has a minimum number of gaps (or even zero gaps) that can cause on-wire wastage, the process, at 630, fills the selected buffers with the data and the header (e.g., as shown in FIGS. 4A and 4C). The process ends at 635 by determining if there is another header and (more) data to process.

Figure 7:
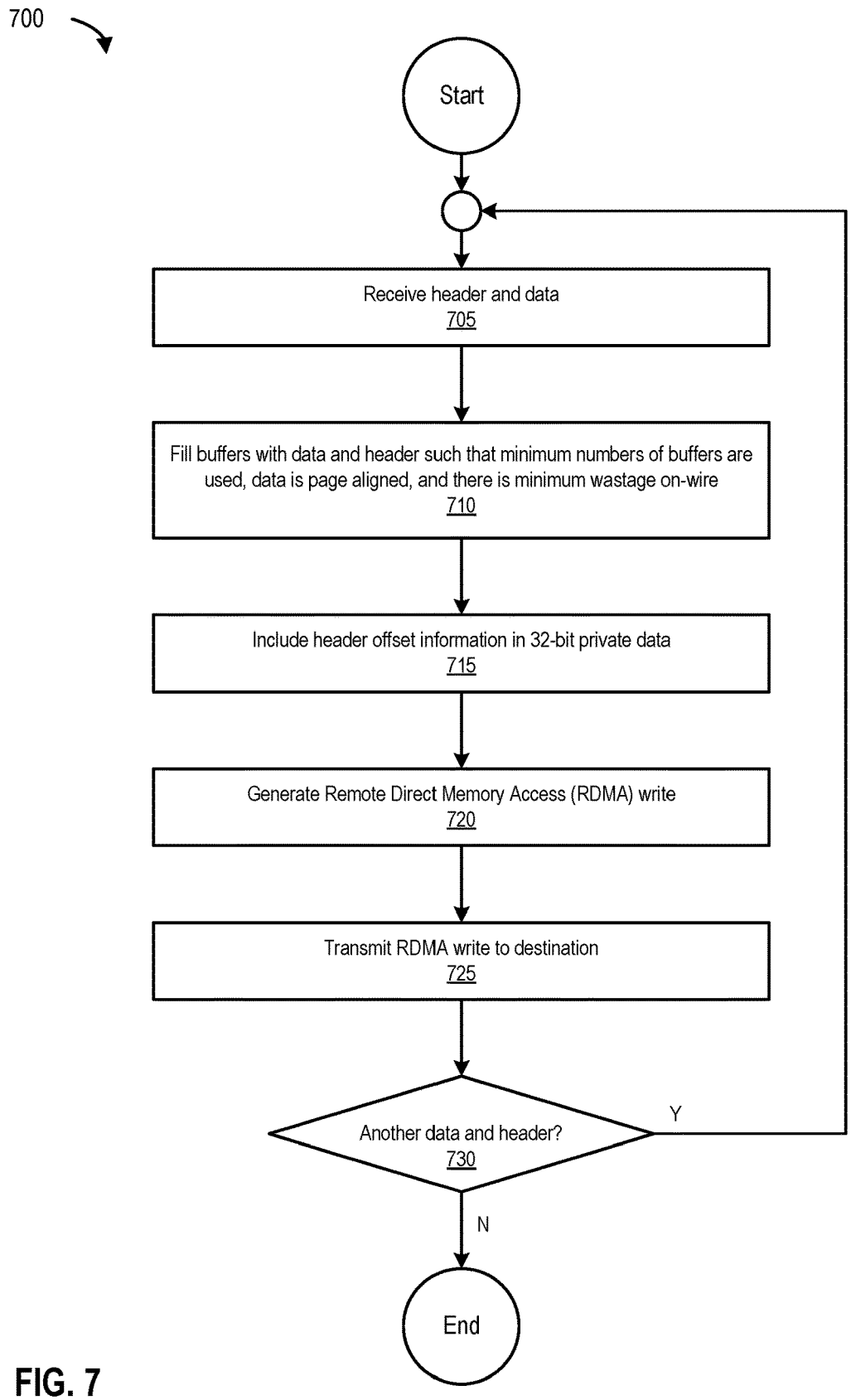
FIG. 7 is a flowchart that illustrates a process for generating and transmitting data and a header using RDMA, according to one embodiment of the present disclosure.

FIG. 7 is a flowchart that illustrates a process for generating and transmitting data and a header using RDMA, according to one embodiment. The process begins at 705 by receiving or accessing data and a header (e.g., from source buffers). At 710, the process writes the data and the header to buffers such that the minimum number of buffers are used, the data is page boundary aligned, the header is aligned, and there is minimum (or no) on-wire wastage.

At 715, the process includes header offset information (e.g., the location of the header if and when the header is written to a particular destination buffer) in 32-bit immediate data 310 (e.g., the 32-bit data space provided as part of API 205). At 720, the process generates an RDMA write (e.g., using RDMA module 210). At 725, the process transmits the RDMA write to a destination along with 32-bit immediate data 310 (e.g., to destination computing system 145). The process ends at 730 by determining if there is another header and (more) data to process.

It will be appreciated that coalescing a header and data by mapping source buffers to one or more destination buffer(s), and writing the header and the data to particularly selected destination buffer(s) based on determined placement/mapping information results in efficient utilization of destination buffers and reduces (or even eliminates) on-wire wastage in OFED-based and RDMA-enabled computing environments. It will also be appreciated that the systems, methods, and processes described herein can also provide increased I/O performance and application throughput in such computing environments.

Example Computing Environment

Figure 8:
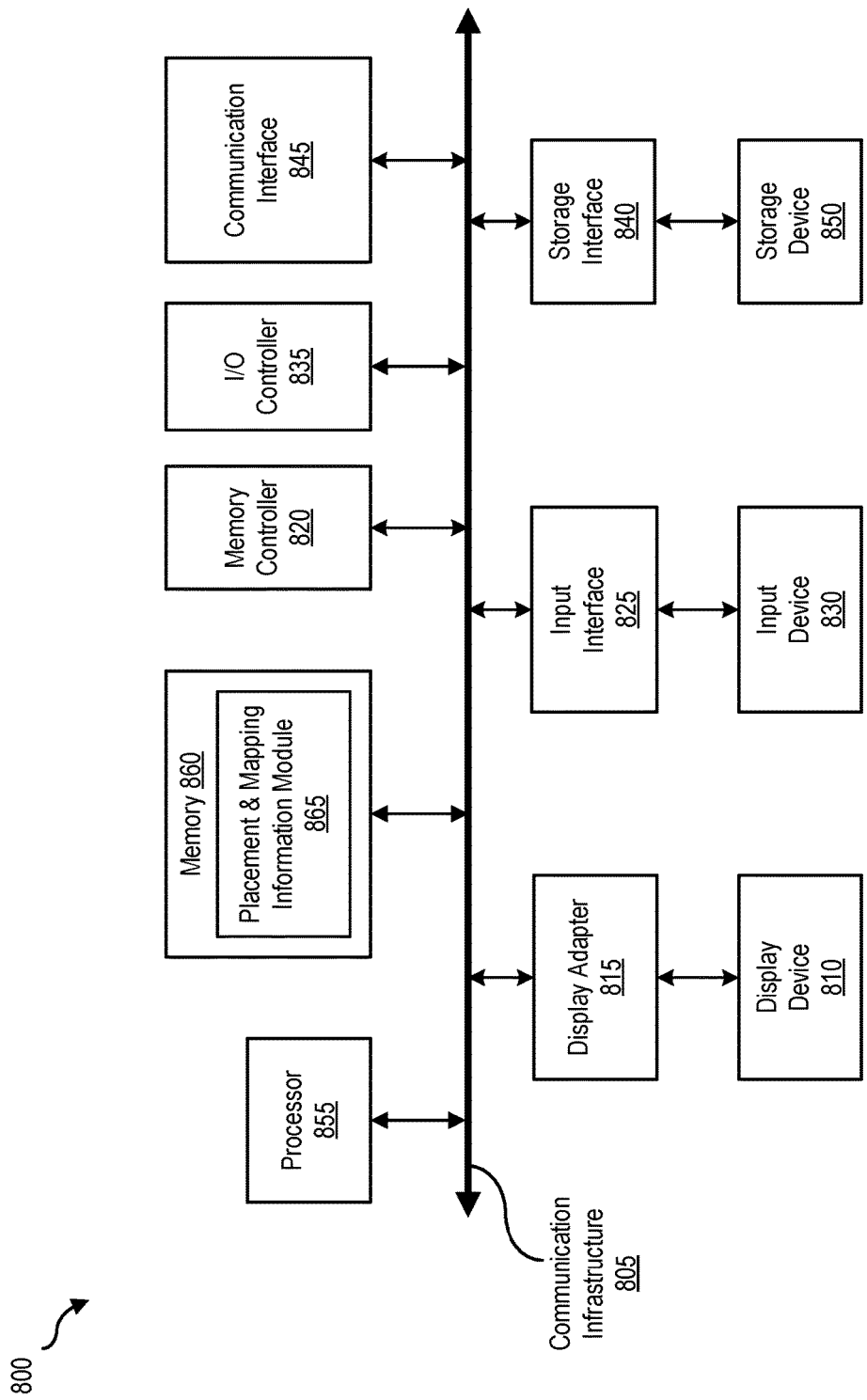
FIG. 8 is a block diagram of a computing system, illustrating how certain module(s) can be implemented in software, according to one embodiment of the present disclosure.

FIG. 8 is a block diagram of a computing system, illustrating how a placement and mapping information module 865 can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array, tape drive, or hard drive controllers), and the like. Computing system 800 may include at least one processor 855 (e.g., source processor 110 or destination processor 175) and a memory 860 (e.g., source memory 120 or destination memory 150). By executing the software that implements source computing system 105 or destination computing system 145, computing system 800 becomes a special purpose computing device that is configured to improve throughput in OpenFabrics environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing placement and mapping information module 865 may be loaded into memory 860 (e.g., source memory 120).

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtual machine, an appliance, a gateway, and/or a computing system. For example, in certain embodiments I/O controller 835 may control or facilitate transfer of data between one or more elements of source computing system 105 or destination computing system 145, such as processor 855 (e.g., source processor 110 or destination processor 175), memory 860 (e.g., source memory 120 or destination memory 150), communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800.

Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
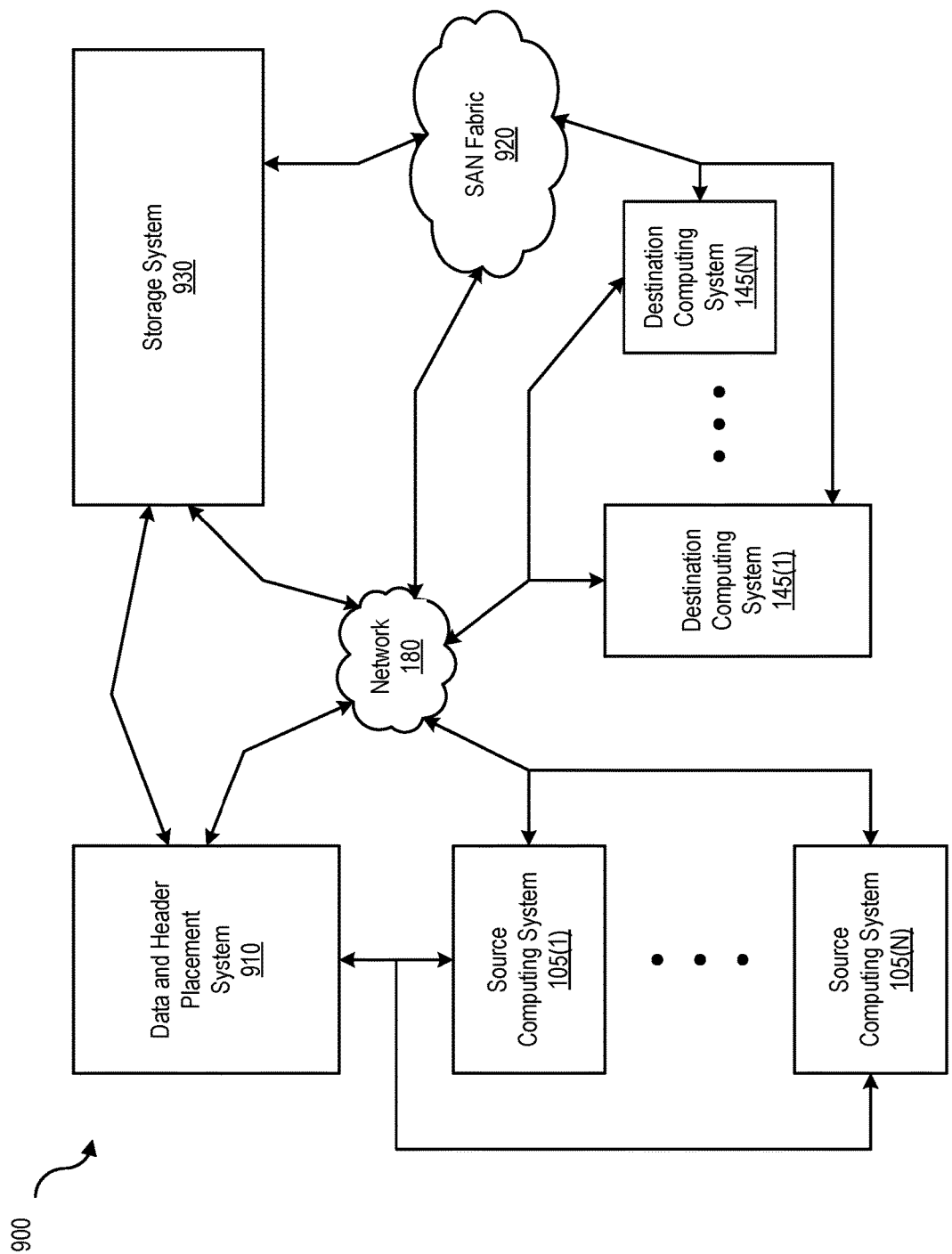
FIG. 9 is a block diagram of a networked system, illustrating how various devices can communicate via a network, according to one embodiment of the present disclosure.

FIG. 9 is a block diagram of a networked system, illustrating how various devices can communicate via a network, according to one embodiment. In certain embodiments, network-attached storage (NAS) devices may be configured to communicate with source computing system 105 and/or destination computing system 145 using various protocols, such as Network File System (NFS), Server Message Block (SMB), or Common Internet File System (CIFS). Network 180 generally represents any type or form of computer network or architecture capable of facilitating communication between source computing system 105 and/or destination computing system 145.

In certain embodiments, a communication interface, such as communication interface 845 in FIG. 8, may be used to provide connectivity between source computing system 105 and/or destination computing system 145, and network 180. It should be noted that the embodiments described and/or illustrated herein are not limited to the Internet or any particular network-based environment. For example, network 180 can be a Storage Area Network (SAN).

In one embodiment, all or a portion of one or more of the disclosed embodiments may be encoded as a computer program and loaded onto and executed by source computing system 105 and/or destination computing system 145, or any combination thereof. All or a portion of one or more of the embodiments disclosed herein may also be encoded as a computer program, stored on source computing system 105 and/or destination computing system 145, and distributed over network 180. In some examples, all or a portion of source computing system 105 and/or destination computing system 145 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, placement and mapping information module 865 may transform the behavior of source computing system 105 and/or destination computing system 145 in order to cause source computing system 105 and/or destination computing system 145 to improve throughput in OpenFabrics and RDMA computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
    receiving data and a header;
    determining a minimum number of buffers that are configured to collectively store the data and the header, wherein
        the minimum number is an integer greater than or equal to two;
    determining placement information for the data and the header within the buffers,
        wherein
        the placement information is determined based, at least in part, on
            a size of each of the buffers,
            a page-boundary-alignment of the data,
            a header alignment of the header, and
            the placement information identifies a second-to-last buffer; and
    writing the data and the header to the buffers, wherein
        the writing of the data uses the placement information,
        the data is written on page boundaries, and
        the header is written on a header boundary of the second-to-last buffer.

2. The computer-implemented method of claim 1, wherein
    using the placement information results in
        utilizing the minimum number of buffers,
        the data being page-boundary-aligned when written to the minimum number of buffers, and
        minimizing on-wire wastage.

3. The computer-implemented method of claim 1, further comprising:
    coalescing the header and the data into a Remote Direct Memory Access (RDMA) write by mapping the header and the data comprised in a plurality of source buffers to the buffers based on the placement information.

4. The computer-implemented method of claim 3, wherein
    the RDMA write comprises a 32-bit data space.

5. The computer-implemented method of claim 4, further comprising:
    including an offset of the header in the 32-bit data space.

6. The computer-implemented method of claim 1, further comprising:
    selecting one or more additional buffers if the data cannot be page-boundary aligned in the minimum number of buffers.

7. The computer-implemented method of claim 1, wherein
    the minimum number of buffers comprise one or more destination buffers.

8. A non-transitory computer-readable storage medium storing program instructions executable to:
    receive data and a header;
    determine a minimum number of buffers that are configured to collectively store the data and the header, wherein
        the minimum number is an integer greater than or equal to two;
    determine placement information for the data and the header within the buffers, wherein the placement information is determined based, at least in part, on
        a size of each of the buffers,
        a page-boundary-alignment of the data,
        a header alignment of the header, and
        the placement information identifies a second-to-last buffer; and
    write the data and the header to the buffers, wherein
        writing the data uses the placement information,
        the data is written on page boundaries, and
        the header is written on a header boundary of the second-to-last buffer.

9. The non-transitory computer-readable storage medium of claim 8, wherein
    using the placement information results in
        utilizing the minimum number of buffers,
        the data being page-boundary-aligned when written to the minimum number of buffers, and
        minimizing on-wire wastage.

10. The non-transitory computer-readable storage medium of claim 8, further comprising:
    coalescing the header and the data into a Remote Direct Memory Access (RDMA) write by mapping the header and the data comprised in a plurality of source buffers to the buffers based on the placement information, wherein
        the RDMA write comprises a 32-bit data space; and
    including an offset of the header in the 32-bit data space.

11. The non-transitory computer-readable storage medium of claim 8, further comprising:

selecting one or more additional buffers if the data cannot be page-boundary aligned in the minimum number of buffers.

12. The non-transitory computer-readable storage medium of claim 8, wherein
the minimum number of buffers comprise one or more destination buffers.

13. A system comprising:
one or more processors; and
a memory coupled to the one or more processors, wherein the memory stores program instructions executable by the one or more processors to:
receive data and a header;
determine a minimum number of buffers that are configured to collectively store the data and the header, wherein
the minimum number is an integer greater than or equal to two;
determine placement information for the data and the header within the buffers, wherein
the placement information is determined based, at least in part, on
a size of each of the buffers,
a page-boundary-alignment of the data, and
a header alignment of the header, and
the placement information identifies a second-to-last buffer; and
write the data and the header to the buffers, wherein
writing the data uses the placement information,
the data is written on page boundaries, and
the header is written on a header boundary of the second-to-last buffer.

14. The system of claim 13, wherein
using the placement information results in
utilizing the minimum number of buffers,
the data being page-boundary-aligned when written to the minimum number of buffers, and
minimizing on-wire wastage.

15. The system of claim 13, further comprising:
coalescing the header and the data into a Remote Direct Memory Access (RDMA) write by mapping the header and the data comprised in a plurality of source buffers to the buffers based on the placement information, wherein
the RDMA write comprises a 32-bit data space; and
including an offset of the header in the 32-bit data space.

16. The system of claim 13, further comprising:
selecting one or more additional buffers if the data cannot be page-boundary aligned in the minimum number of buffers.

17. The system of claim 13, wherein
the minimum number of buffers comprise one or more destination buffers.

* * * * *

UNITED STATES PATENT AND TRADEMARK OFFICE
CERTIFICATE OF CORRECTION

PATENT NO. : 10,375,168 B2  
APPLICATION NO. : 15/168449  
DATED : August 6, 2019  
INVENTOR(S) : Adhiraj Joshi and Abhijit Toley Page 1 of 1

It is certified that error appears in the above-identified patent and that said Letters Patent is hereby corrected as shown below:

In the Claims

In Claim 2, Column 16, Line 1 should read as follows:
2. The computer-implemented method of claim 1, wherein
the use of the placement information results in
utilizing the minimum number of buffers,
the data being page-boundary-aligned when written to the minimum number of buffers,
    and
minimizing on-wire wastage.

Signed and Sealed this  
Eighth Day of September, 2020

Andrei Iancu  
*Director of the United States Patent and Trademark Office*